United States Patent [19]

Holman

[11] 3,763,435

[45] Oct. 2, 1973

[54] CIRCUIT FOR DECIDING ABOUT THE POSITION OF THE REPETITION FREQUENCY OF SIGNAL TRANSITIONS IN AN INPUT SIGNAL

[76] Inventor: Benedictus Timotheus Johannes Holman, Emmasingel, Eindhoven, Netherlands

[22] Filed: Apr. 13, 1972

[21] Appl. No.: 243,593

[30] Foreign Application Priority Data

Apr. 17, 1971 Netherlands .................... 7105201
Mar. 18, 1972 Netherlands .................... 7203658

[52] U.S. Cl. ................ 328/140, 328/138, 328/150, 328/117

[51] Int. Cl. ........................................ H03b 3/04

[58] Field of Search .................. 328/133, 134, 117, 328/140, 141, 138, 150

[56] References Cited

UNITED STATES PATENTS

| | | | |
|---|---|---|---|
| 3,205,438 | 9/1965 | Buck | 328/133 X |
| R26,210 | 5/1967 | Russell | 328/134 X |
| 3,413,490 | 11/1968 | Breunig et al. | 328/140 X |
| 3,474,341 | 10/1969 | Crafts et al. | 328/140 X |
| 3,634,772 | 1/1972 | Katz | 328/141 X |

*Primary Examiner*—John S. Heyman
*Attorney*—Frank R. Trifari

[57] ABSTRACT

In deciding about the position of the repetition frequency of signal transitions in an input signal, ambiguities occur when these decisions are made on a frequency base or on an amplitude base. Unambiguous decisions are made in a decision circuit acting on a time base. This circuit includes a number of monostable relaxation generators having different relaxation periods, while the outputs of said relaxation generators are connected to a cascade circuit of a combination network and a smoothing filter. A threshold circuit connected to the cascade circuit provides the desired decision signal. In this decision circuit, the limits of the frequency interval may be adjusted electronically without modifying the relaxation periods of the relaxation generators.

7 Claims, 12 Drawing Figures

Patented Oct. 2, 1973 3,763,435

6 Sheets-Sheet 3

CIRCUIT FOR DECIDING ABOUT THE POSITION OF THE REPETITION FREQUENCY OF SIGNAL TRANSITIONS IN AN INPUT SIGNAL

The invention relates to a decision circuit which, in response to an input signal in which signal transitions passing through a fixed reference level in a given direction occur at a given repetition frequency, generates a decision signal which is dependent on the position of said repetition frequency relative to a prescribed restricted frequency interval. Such circuits may serve to decide whether said repetition frequency lies inside or outside a given frequency interval, and more particularly to decide in which interval, of a number of possible frequency intervals accurately adjoining one another, this repetition frequency lies, for example, for the control of processes, for the remote control of equipment, for calling subscribers, etc.

Particularly when an unambiguous decision is required as to the frequency interval in which said repetition frequency lies, special attention must be paid to the construction of such a decision circuit. This requirement leads to practical difficulties, if the repetition frequency lies in the vicinity of the limits of the adjacent frequency intervals. To make a decision about the position of this repetition frequency, a number of parallel-arranged bandpass filters having adjoining frequency pass bands might be used in known manner. Evelope detectors are connected to these bandpass filters. The requirement of an unambiguous decision implies that, for accurate adjoining of their pass bands, the bandpass filters must have infinitely steep slopes at their cut-off frequencies. This requirement cannot be realized with sufficient approximation, and certainly not for bandpass filters having a low center frequency and a small bandwidth, even when using a multitude of components. When the requiremnet of unambiguity is still maintained, accurate adjoining of the pass bands can no longer be realized with the slopes which can be obtained in practice. Likewise, when a linear frequency discriminator, followed by a number of parallel-arranged amplitude filters having adjoining amplitude pass bands, would be used in known manner, difficulties of the same nature occur, because in practice the requirement of an unambiguous decision cannot be combined with accurate adjoining of the pass bands.

The invention has for its object to provide a decision circuit of the type described in the preamble in which an unambiguous decision is made by using a different principle. The invention also has for its purpose to provide repetition frequencies in the vicinity of the limits of a given frequency interval so that accurate adjoining of the intervals in a series of successive frequency intervals is made possible. This decision circuit is furthermore, suitable for electronically adjusting the limits of a given frequency interval so that the possibilities for utilizing the decision circuit, especially for remote control, are extended. The decision circuit is particularly simple in structure and can be formed substantially as an integrated semiconductor circuit.

The decision circuit according to the invention is characterized in that it includes at least two monostable relaxation generators having different relaxation periods, whose inputs are coupled to a common signal input of the decision circuit. The relaxation generators change over to their quasi-stable state at said signal transitions, and provide output pulses having a duration independent of the repetition frequency of said signal transitions. The outputs of the relaxation generators are connected to a cascade circuit of a combination network, and a smoothing filter for producing a smoothed difference between said output pulses from the relaxation generators. The output of the cascade circuit is connected to a threshold circuit, whose output constitutes a decision signal output for the decision circuit.

With regard to the known methods of making decisions about the positions of a repetition frequency relative to a given frequency interval, according to which methods of the decision is effected on a frequency base or an amplitude base, as set forth above, the decision circuit according to the invention is clearly distinguished in that the decision is made on a time base.

The invention and its advantages will now be described with reference to the Figures, in which FIG. 1 shows a decision circuit according to the invention, while FIG. 2 shows some time diagrams, and FIG. 3 shows some frequency diagrams, to explain the operation of the decision circuit according to FIG. 1.

Figure 6:
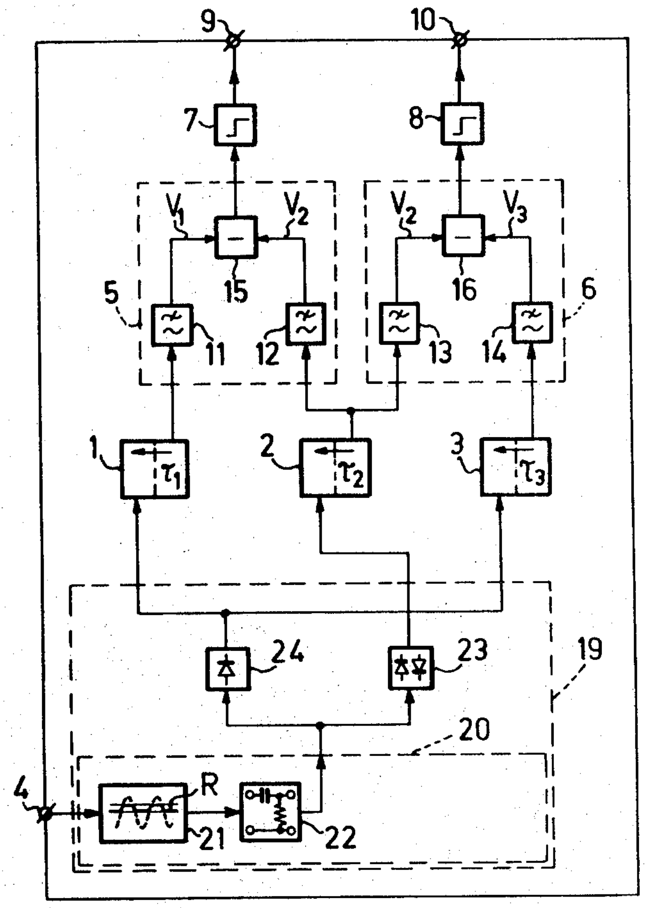
FIG. 6 shows a modification of the decision circuit of FIG. 1, provided with an adjusting circuit for controlling the position of one of the limits of the prescribed frequency interval.
Figures 9, 10, 11, 12:
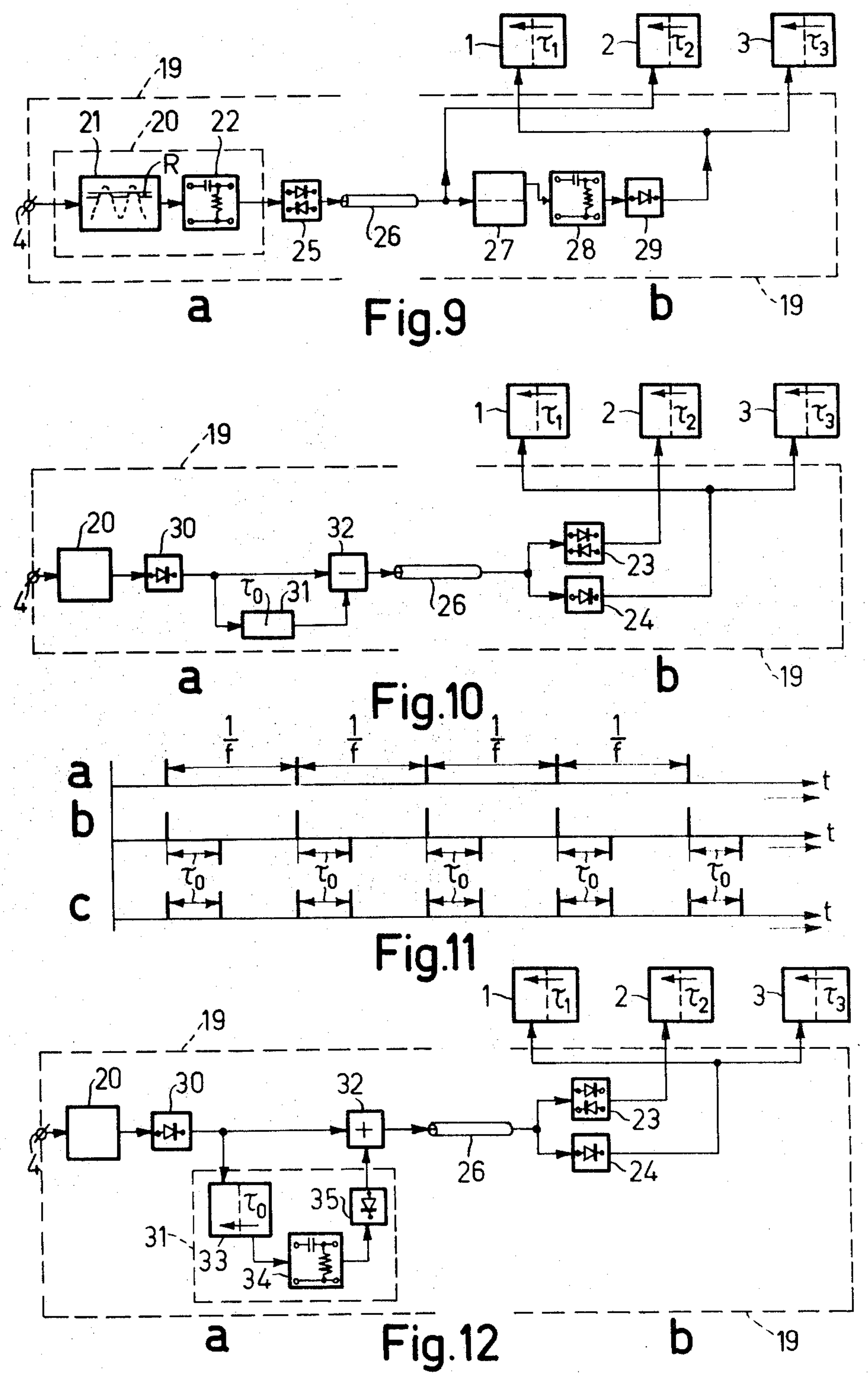

FIG. 9, FIG. 10, and FIG. 12 show modifications of the adjusting circuit used in the decision circuit of FIG. 6, while FIG. 11 shows some time diagrams to explain the adjusting circuit of FIG. 10.

Figure 1:
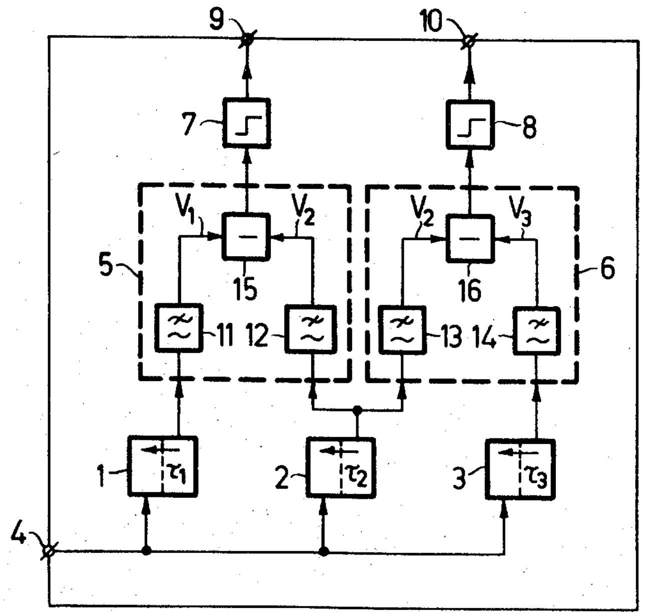

The decision circuit shown in FIG. 1 is adapted to decide for an input signal, in which signal transitions passing through a fixed reference level R in a given direction occur at a given repetition frequency $f$, whether this repetition frequency $f$ lies inside a prescribed frequency interval $(f_1, f_2)$, or an accurately adjoining frequency interval $(f_2, f_3)$, or lies outside these two intervals. The input signal may generally have an arbitrary shape, but the repetition frequency $f$ of these signal transitions may depend on the reference level R itself. For instance, for an input signal of the shape shown at *a* in FIG. 2 the positive-going signal transitions through the reference level $R_1$ occur at a repetition frequency $f_o$ and those through the reference level $R_2$ occur at the double repetition frequency $2f_o$. To simplify the further description of FIG. 1, it is now assumed that the input signal has the shape shown at *b* in FIG. 2, in which pulses occur at the repetition frequency $f$, and in which the reference level R is zero, so that the occurrence of the pulses coincides with the positive-going signal transitions through the reference value R.

Figure 3:
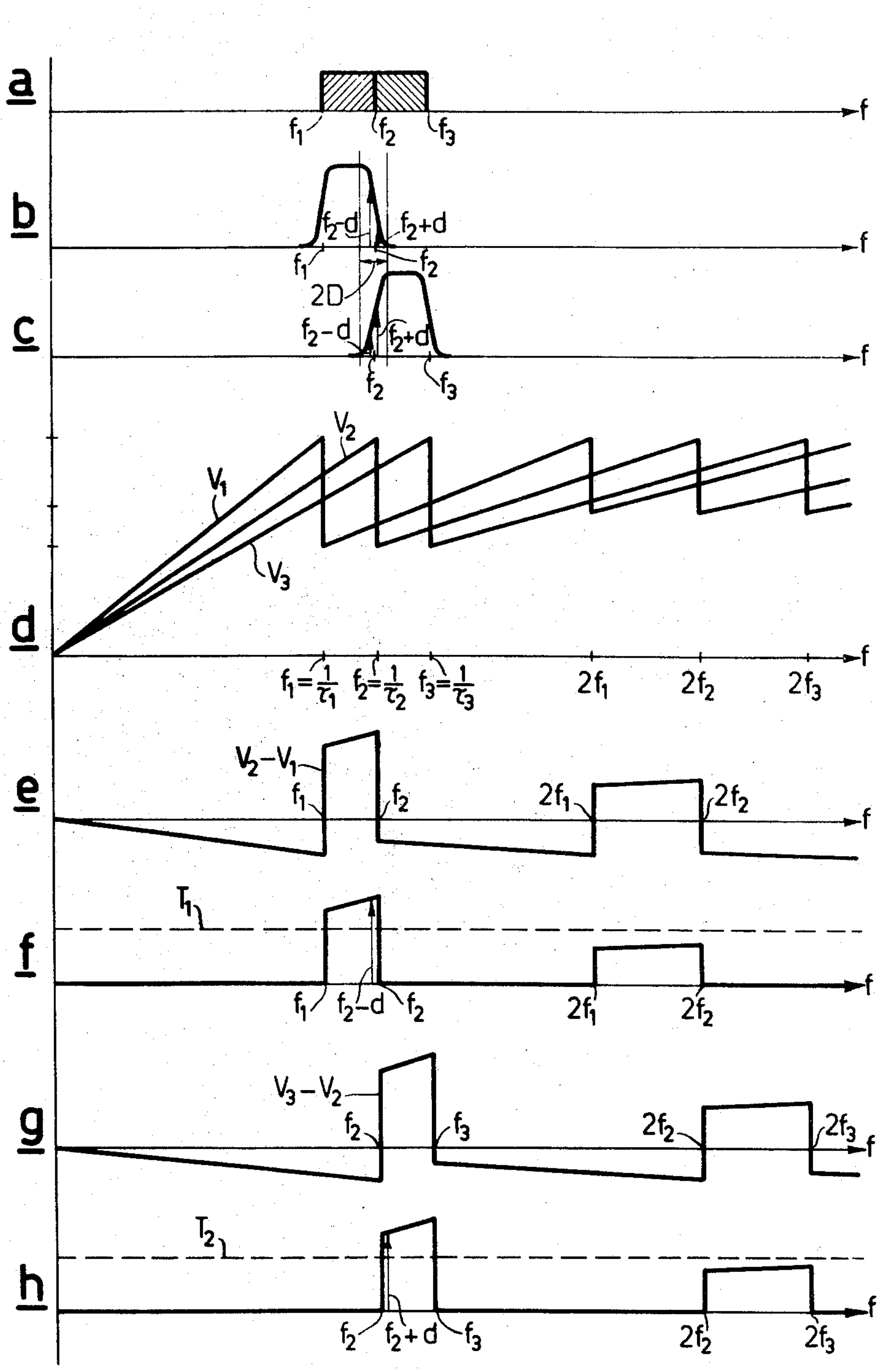

FIG. 3 shows at *a* the frequency intervals $(f_1, f_2)$ and $(f_2, f_3)$ which adjoin each other accurately and are prescribed for the decision circuit of FIG. 1. The decision about the position of the repetition frequency f relative to the frequency intervals $(f_1, f_2)$ and $(f_2, f_3)$, might be based on a selection of the interval $(f_1, f_2)$ by means of a first bandpass filter having a pass band $(f_1, f_2)$, and a selection of the interval $(f_2, f_3)$ by means of a second bandpass filter having a pass band $(f_2, f_3)$ which accurately adjoins the pass band $(f_1, f_2)$. FIG. 3 shows at *b* and $c$ practical examples of the transfer characteristics of this first and second bandpass filter. FIG. 3 shows that in this case, for a repetition frequency $f=f_2-d$ in the vicinity of the common limit frequency $f_2$, not only the first bandpass filter provides an output signal, but also the second bandpass filter provides an output signal, although this is weaker. Likewise, both the second bandpass filter and the first bandpass filter provide an output signal at the repetition frequency $f=f_2+d$. A decision about the position of the repetition frequency $f$ which would be made on the basis of the absence or presence of an output signal from the bandpass filters, is thus ambiguous for the repetition frequencies $f$ in the vicinity of the common limit frequency $f_2$, because both bandpass filters then provide an output signal. Furthermore, FIG. 3 shows that ambiguous decisions occur in the frequency-interval $(f_2-D, f_2+D)$ which corresponds to the upper roll-off and the lower roll-off of the first and the second bandpass filter, respectively. To avoid ambiguities in case of accurate adjoining of the frequency intervals, $(f_1, f_2)$ and $(f_2, f_3)$, the width $2D$ of the ambiguity interval $(f_2-D, f_2+D)$ would have to approach zero, or in other words, the slope of the bandpass filters cut-off frequency $f_2$ would have to become infinitely larger. This requirement cannot even approximately be realized in practice, and certainly not for bandpass filters having low center frequencies and small bandwidths.

According to the invention it is decided in an unambiguous manner, whether the repetition frequency $f$ lies inside the interval $(f_1, f_2)$, the interval $(f_2, f_3)$, or outside both intervals. The decision circuit includes three monostable relaxation generators 1, 2, 3 (FIG. 1) having different relaxation periods $\tau_1$, $\tau_2$, $\tau_3$ whose inputs are coupled to a common signal input 4 of the decision circuit. The relaxation generators 1, 2, 3 change over to their quasi-stable state at the said positive-going signal transitions through the fixed reference level R, and provide output pulses having a duration independent of this repetition frequency $f$. The outputs of the relaxation generators 1, 2 and 2, 3 being connected to cascade circuits 5 and 6, respectively, of a combination network. A smoothing filter is provided for producing a smoothed difference between said output pulses for the relaxation generators 1, 2 and 2, 3, respectively. The outputs of the cascade circuits 5 and 6 are connected to threshold circuits 7 and 8, respectively, whose outputs constitute decision signal outputs 9 and 10, respectively, of the decision circuit.

In the embodiment shown in FIG. 1, relaxation generators 1 and 2 co-operate for the decision about the position of the repetition frequency f relative to the interval $(f_1, f_2)$, and likewise, relaxation generators 2 and 3 co-operate for the decision relative to the interval $(f_2, f_3)$. To this end the relaxation periods $\tau_1$, $\tau_2$, $\tau_3$ of relaxation generators 1, 2, 3, respectively, are chosen to be such that $\tau_1 = 1/f_1$, $\tau_2 = 1/f_2$ and $\tau_3 = 1/f_3$. Furthermore, the outputs of relaxation generators 1, 2 and 2, 3 are connected in cascade circuits 5 and 6 through separate smoothing filters 11, 12 and 13, 14 to a combination network constituted as difference producers 15 and 16, respectively. The threshold circuits 7, 8 connected to the outputs of different producers 15, 16 only pass signals having a positive polarity, while by suitable choice of the threshold level the presence of a signal at the decision outputs 9 and 10 indicates unabmiguously that the repetition frequency f lies inside the intervals $(f_1, f_2)$ and $(f_2, f_3)$, respectively. The absence of a signal at the two decision outputs 9, 10 indicates unambiguously that the repetition frequency f lies outside these intervals.

Figure 2:
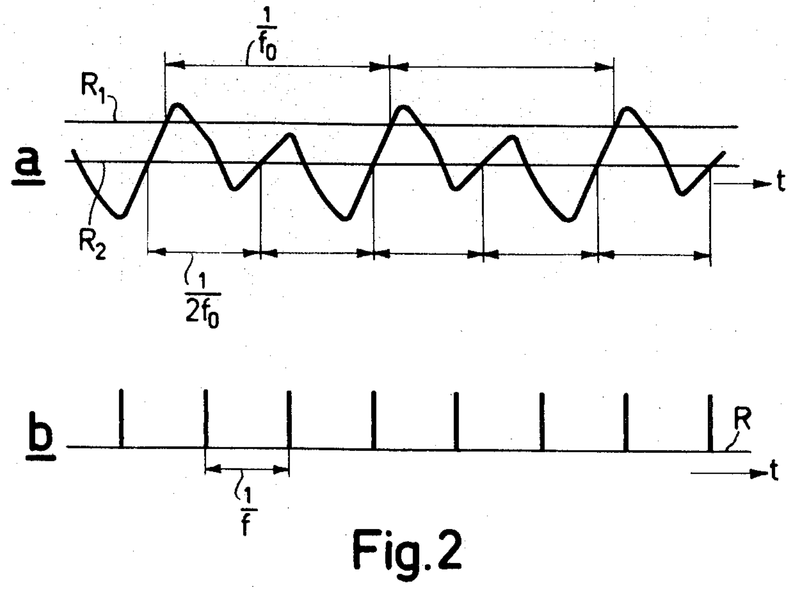

The operation of the decision circuit of FIG. 1, when applying an input signal of the shape shown at $b$ in FIG. 2, will now be further described.

When the pulses in this input signal occur at a repetition frequency f, which is lower than the frequency $f_1 = 1/\tau_1$, monostable relaxation generator 1 changes to its quasi-stable state at each pulse, and remains in this state during a period which is equal to the relaxation period $\tau_1$. A period $\tau_1$ after the occurrence of the pulse, relaxation generator 1 resumes its stable state and remains in this state until the occurrence of the next pulse in the input signal. Pulses having a repetition frequency $f$ and a pulse duration $\tau_1$ then occur at the output of relaxation generator 1. The mean value $V_1$ of this output signal is obtained with the aid of smoothing filter 11. When the output pulses from relaxation generator 1 have an amplitude $A$, the mean value $V_1$, in this case, is equal to $A\ \tau_1 f$. When $f=0$, $V_1=0$ too and for an increasing value of $f$, $V_1$ increases proportionally to $f$ and $V_1$ reaches the value $A$ when $f=1/\tau_1 = f_1$.

When the repetition frequency $f$ further increases, $V_1$ for values of $f$ just greater than $f_1$ abruptly decreases to the value $A/2$. This is caused by the fact, that when relaxation generator 1 changes to its quaoi-stable state at a given pulses, the next pulse in the input signal occurs within a time $\tau_1$ after this transition and hence, as is known, has no influence on the quasistable state.. Also, in this case, relaxation generator 1 resumes its stable state after a period $\tau_1$, and remains in this state until the occurrence of the second pulse in the input signal after the transition to the quasistable state. The pulses having a pulse duration $\tau_1$ then occur at the output of relaxation generator 1 at a repetition frequency $f/2$, so that the mean value $V_1$ is then qual to $A\ \tau_1 f/2$. When $f=1/\tau_1 = f_1$, $V_1$ then has the value $A/2$ and for an increasing value of $f$, $V_1$ increases proportionally to $f$, but the slope is now half that for $f$ smaller than $f_1$; for $f = 2/\tau_1 = 2f_1$, $V_1$ again reaches the value $A$.

When the repetition frequency $f$ still further increases, $V_1$ decreases abruptly for values of $f$ which are just greater than $2f_1$ and assumes the value $2A/3$. In this case, two pulses of the input signal occur within a duration $\tau_1$ after a transition of relaxation generator 1 to its quasi-stable state, so that relaxation generator 1 provides an output pulse having a pulse duration $\tau_1$ only at every third pulse in the input signal. In this case, the mean value $V_1$ is equal to $A\ \tau_1 f/3$ and has the value of $2A/3$ when $f=2/\tau_1 = 2f_1$. For an increasing value of $f$, $V_1$ increases proportionally to $f$, but with a slope which is one third of that of $f$ smaller than $f_1$; when $f=3/\tau_1 = 3f_1$, $V_1$ again reaches the value $A$. Likewise, the mean value $V_1$ abruptly decreases from the value $A$ to the value $nA/(n+1)$ at repetition frequencies $f=nf_1=n/\tau_1$ with $n=1, 2, 3, \ldots$ and for repetition frequencies $f$ between $nf_1$ and $(n+1)f_1$, the mean value $V_1$ is equal to $A\ \tau_1 f/(n+1)$. The variation of the mean value $V_1$ as a function of the repetition frequency $f$ is shown at $d$ in FIG. 3.

Analogously, it can be shown for relaxation generators 2 and 3, that the mean values $V_2$ and $V_3$ of their output signals obtained with the aid of smoothing filters 12, 13 and 14, abruptly decrease from the value $A$ to the value $nA/(n+1)$ at the frequencies $f=f_2=n/\tau_2$ and $f=nf_3=n/\tau_3$ with $n=1, 2, 3 \ldots$, for frequencies $f$ between $nf_2$ and $(n+1)f_2$. the mean value $V_2$ is equal to $A\ \tau_2 f/(n+1)$, and for frequencies $f$ between $nf_3$ and $(n+1)f_3$, the mean value $V_3$ is equal to $A\ \tau_3 f/(n+1)$. The variation of $V_2$ and $V_3$ as a function of $f$ is likewise shown at $d$ in FIG. 3.

The mean value $V_1$ is then subtracted from the mean value $V_2$ in difference producer 15. The variation of this difference signal $V_2-V_1$ as a function of the frequency $f$ is shown at $e$ in FIG. 3. As is also apparent from FIG. 3, $V_2-V_1$ abruptly changes from a negative to a positive value at the frequencies $f=nf_1$, and $V_2-V_1$ abruptly changes from a positive to a negative value at the frequency $f=nf_2$. A decision signal having a variation as a function of the frequency $f$ as shown at $f$ in FIG. 3, is then produced at the output 9 of a threshold circuit 7, which passes positive signals only. When the repetition frequency $f$ of the input signal increases rom the value $f=0$, no decision signal occurs at the output 9 as long as $f$ is smaller than $f_1$. However, at the frequency $f=f_1$ a decision signal abruptly appears at output 9, which remains present for frequencies $f$ inside the interval $(f_1, f_2)$, while for the frequency $f=f_2$ this decision signal disappears abruptly. Likewise for frequencies $f$ just greater than $f_2$ no decision signal occurs.

As is also apparent from the transfer characteristic $f$ of FIG. 3, this decision signal exhibits the same behavior for the intervals $(nf_1, nf_2)$ with $n = 2, 3, \ldots$ as for the interval $(f_1, f_2)$. The value of this decision signal for the first higher-order pass interval $(2f_1, 2f_2)$ is already considerably lower than for the interval $(f_1, f_2)$, and decreases still further as n becomes greater. When these higher-order pass intervals are unwanted, they can be suppressed in a simple manner in practice by giving the threshold level of threshold circuit 7 a suitably chosen positive value, for example, the value denoted by broken line $T_1$ shown at $f$ in FIG. 3. This increased threshold level does not exert influence on the behavior of the decision signal in the interval $(f_1, f_2)$.

Thus, the decision circuit indicates very clearly whether the repetition frequency $f$ lies inside or outside the frequency interval $(f_1, f_2)$, while the transfer characteristic of the decision circuit (compare $f$ of FIG. 3) at the limit frequencies $f_1$ and $f_2$ of this interval $(f_1, f_2)$ basically has infinitely steep slopes. As a result, it is possible to have a second, similarly formed transfer characteristic for the interval $(f_2, f_3)$ accurately adjoin the characteristic for interval $(f_1, f_2)$ without the risk of ambiguities, when making decisions about repetition frequencies f in the vicinity of the common limit frequency $f_2$. For the decision circuit described, this second transfer characteristic is obtained by means of difference producer 16 forming the difference signal $V_3-V_2$ with a variation as a function of $f$, as is shown at $g$ in FIG. 3, and by passing this difference signal $V_3-V_2$ as a decision signal to output 10 for positive values only, by means of threshold circuit 8. This second transfer characteristic of the decision circuit then has the shape shown at $h$ in FIG. 3, in which likewise, infinitely steep slopes occur at the limit frequencies $f_2$ and $f_3$ of frequency interval $(f_2, f_3)$. Also in this case, the higher-order pass intervals may be suppressed by giving the threshold level of threshold circuit 8 a suitably chosen positive value as is shown, for example, by broken line $T_2$ at $h$ in FIG. 3.

In this manner, the desicion circuit according to the invention decides very clearly whether the repetition frequency $f$ of the input signal lies inside the interval $(f_1, f_2)$, inside the accurately adjoining interval $(f_2, f_3)$, or lies outside these two intervals. Any ambiguity of the decision is then avoided, even for repetition frequencies $f$ in the vicinity of the common limit frequency $f_2$. Thus, for example, a repetition frequency $f=f_2-d$ near $f_2$ exclusively provides a decision signal at output 9 (compare $f$ in FIG. 3), and likewise a repetition frequency $f=f_2+d$ exclusively provides a decision signal at output 10 (compare $h$ in FIG. 3). This is in contrast with the procedure for the bandpass filters described hereinbefore, in which both the first and the second bandpass filter provides an output signal in both cases (compare $b$ and $c$ in FIG. 3).

The considerations mentioned above may be extended without any difficulty for the case of a number of p accurately adjoining frequency intervals $(f_1, f_2) \ldots (f_p, f_{p+1})$, for which purpose the decision circuit according to the invention need only include $(p+1)$ monostable relaxation generators having relaxation periods.. $\tau_1=1/f_1$, $\tau_2=1/f_2$, . . . . , $\tau_p=1/f_p$, $\tau_{p+1}=1/f_{p+1}$. Just as was already described with reference to FIG. 1, pairs of successive relaxation generators are connected to a cascade circuit of a difference producer, and a smooth filter is provided for producing a decision signal for the interval determined by the relevant relaxation periods. In practice, the smoothing filters connected to one and the same relaxation generator are combined to a common smoothing filter; compare, for example, relaxation generator 2 in FIG. 1, in which the mean value $V_2$ occurs at the outputs of both smoothing filter 12 and smoothing filter 13.

The use of the steps according to the invention, results in a decision circuit which also for a repetition frequency near the common limits of a given interval in a number of accurately adjoining frequency intervals, unambiguously decides where this repetition frequency lies and in addition, this decision circuit is conveniently arranged with a number of monostable relaxation generators that need only be one greater than the number of possible frequency intervals. Furthermore, the practical realization of the decision circuit is very simple, and it may be substantially formed as an integrated semiconductor circuit while using, or example, monostable multivibrators as relaxation generators.

Figure 4:
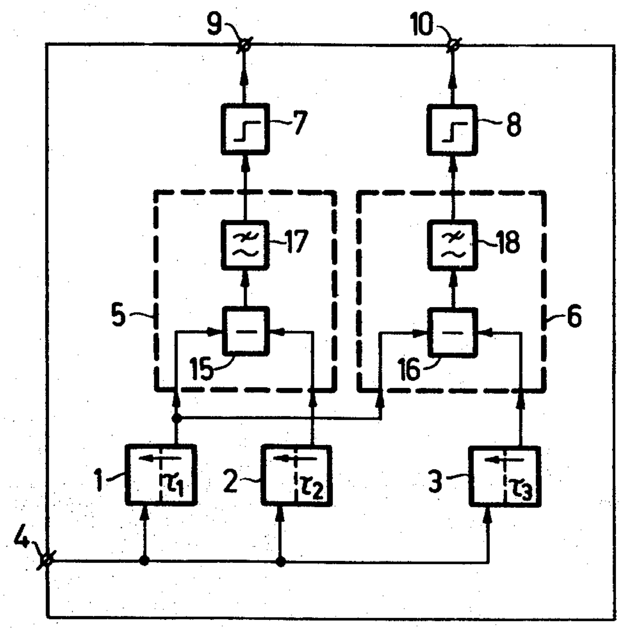
FIG. 4 shows a modification of the decision circuit according to FIG. 1.

FIG. 4 shows a modification of the decision circuit according to the invention in which elements which correspond to those in FIG. 1 have the same reference numerals in FIG. 4.

This decision circuit differs from that of FIG. 1 as regards the construction of the cascade circuits 5 and 6., In these cascade circuits 5 and 6 the outputs of relaxation generators 1, 2, 3 are directly connected to difference producers 15, 16, and the outputs of difference producers 15, 16 are connected through single smoothing filters 17, 18 to the associated threshold circuits 7, 8. As regards the operation, there is no difference at all between the cascade circuits of FIG. 1 and those of FIG. 4.

Figure 5:
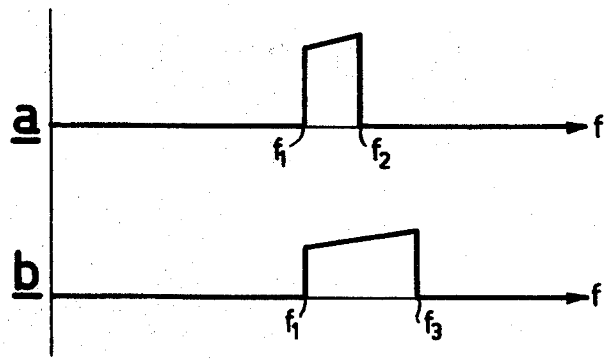
FIG. 5 shows some frequency diagrams for the decision circuit according to FIG. 4.

Furthermore, the decision circuit of FIG. 4 is adapted to decide, likewise as that of FIG. 1, the position of the repetition frequency $f$ relative to the interval $(f_1, f_2)$ but, unlike the circuit of FIG. 1, it is also adapted to decide the position of this repetition frequency $f$ relative to the interval $(f_1, f_3)$, which entirely includes the interval $(f_1, f_2)$. For this purpose, like in FIG. 1, relaxation generators 1 and 2 having relaxation periods $\tau_1=1/f_1$ and $\tau_2=1/f_2$ are connected to cascade circuit 5, and for a suitably chosen threshold level of threshold circuit 7, the presence or absence of a signal at decision output 9 indicates unambiguously whether $f$ lies inside or outside interval $(f_1, f_2)$, as described hereinbefore. For the decision relating to frequency interval $(f_1, f_3)$, relaxation generators 1 and 3 having relaxation periods $\tau_1 = 1/f_1$ and $\tau_3 = 1/f_3$ are connected to cascade circuit 6 in FIG. 4, and for a suitably chosen threshold level of threshold circuit 8, the presence or absence of a signal at decision output 10 indicates unambiguously whether f lies inside or outside interval $(f_1, f_3)$. In FIG. 5, the transfer characteristics of the decision circuit of FIG. 4 are shown at $a$ for frequency interval $(f_1, f_2)$, and at $b$ for frequency interval $(f_1, f_3)$. When the repetition frequency $f$ of the signal at input 4 increases from $f = 0$, a decision signal does not occur at any of the outputs 9 and 10 as long as $f$ is smaller than $f_1$. For $f=f_1$ a decision signal abruptly appears at both output 9 and output 10, which signal remains present when $f$ lies inside interval $(f_1, f_2)$. The decision signal abruptly disappears at output 9 at $f = f_2$, and does not occur when $f$ is greater than $f_2$, whereas the decision signal still remains present at output 10 as long as $f$ is smaller than $f_3$, and only disappears abruptly when $f=f_3$. When $f$ is greater than $f_3$, a decision signal again does not occur at any of the two outputs 9 and 10.

In the decision circuits described so far, the limits of the prescribed frequency intervals are determined by the choice of the relaxation periods of the relevant monostable relaxation generators. A variation of one of the limits, for example, the common limit frequency $f_2$ of the intervals $(f_1, f_2)$ and $(f_2, f_3)$ prescribed for the decision circuit of FIG. 1, implies that the relaxation period determining this limit frequency, i.e., relaxation period $\tau_2$ of relaxation generator 2, must have a different value. For some applications such variations of the relaxation periods of the relaxation generators may have practical drawbacks, especially when the decision circuit is not very accessible.

FIG. 6 shows a modification of the decision circuit of FIG. 1, in which a variation of the limits of the prescribed frequency intervals $(f_1, f_2)$ and $(f_2, f_3)$ can be effected in a simple manner without changing the relaxation periods $\tau_1$, $\tau_2$, $\tau_3$ of relaxation generators 1, 2, 3. Elements corresponding to elements in FIG. 1 have the same reference numerals in FIG. 6.

In the decision circuit of FIG. 6, an adjusting circuit 19 controlled by the input signal precedes the relaxation generators 1, 2, 3, which adjusting circuit includes a signal transition detector 20. A first pulse series is produced in adjusting circuit 19 by means of signal transition detection, the pulses of said first pulse series corresponding to said signal transitions through the reference level R. Also a second pulse series is provided whose pulses are shifted in time relative to said first pulse series, said adjusting circuit 19 applying both pulse series combined as a series of trigger pulses to at least one of the relaxation generators 1, 2, 3 for controlling the position of at least one of the limits of said prescribed frequency intervals $(f_1, f_2)$ and $(f_2, f_3)$.

Figure 7:
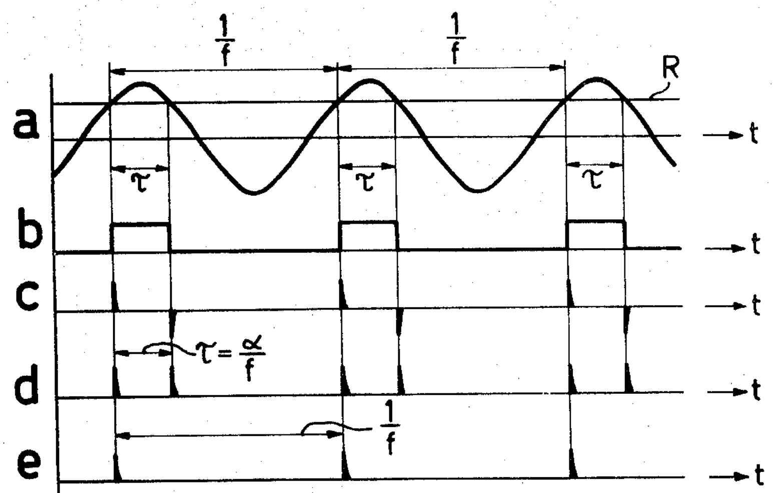
FIG. 7 shows some time diagrams.
Figure 8:
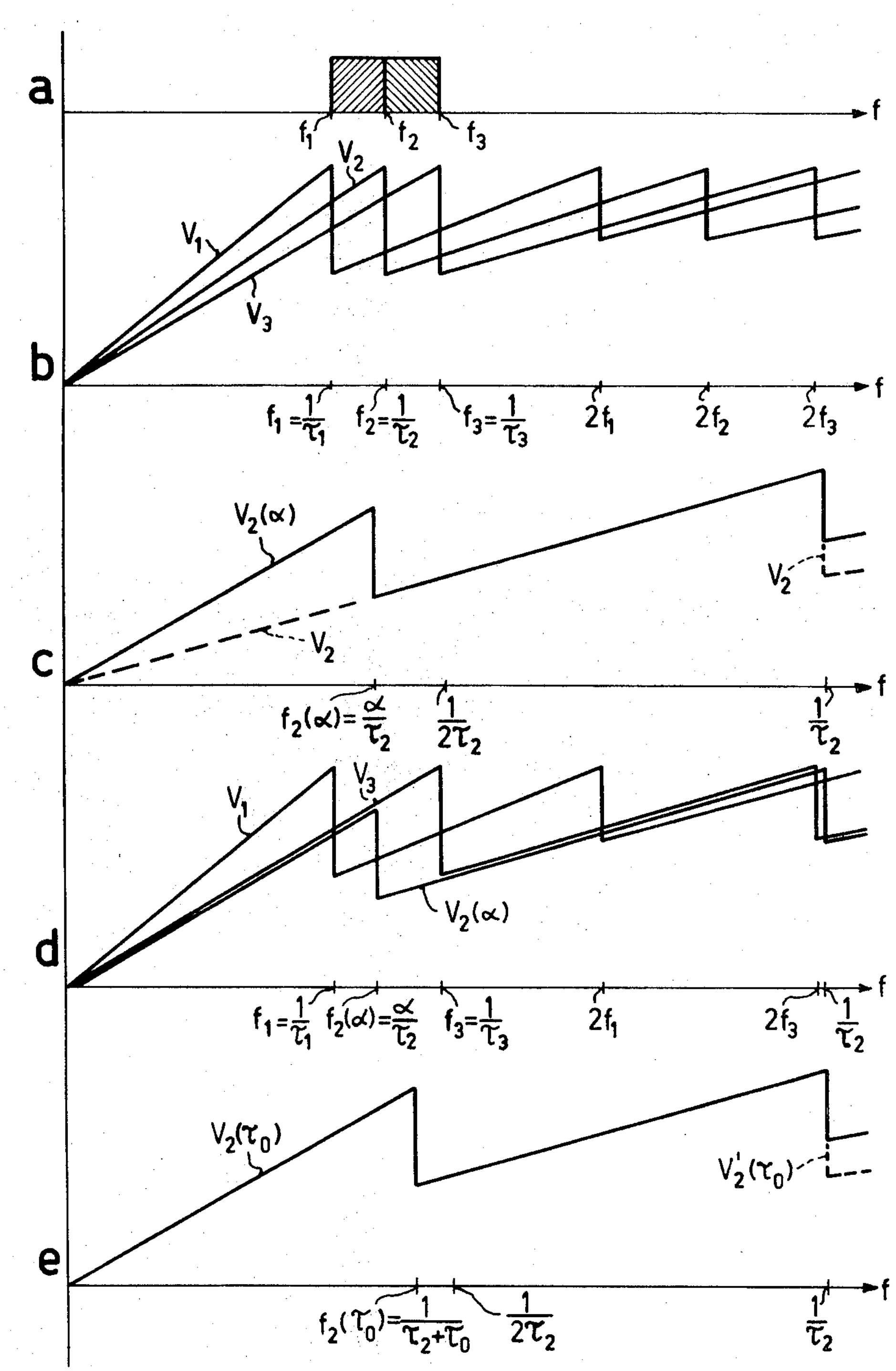
FIG. 8 shows some frequency diagrams to explain the operation of the decision circuit of FIG. 6.

The embodiment shown in FIG. 6 is adapted to control the common limit frequency $f_2$ of the two intervals $(f_1, f_2)$ and $(f_2, f_3)$; to simplify the description of FIG. 6, it is assumed that the input signal varies sinusoidally as is shown at $a$ in FIG. 7, in which the repetition frequency $f$ of the positive-going signal transitions through the reference level R is independent of this reference value level R. The frequency intervals $(f_1, f_2)$ and $(f_2, f_3)$ prescribed to the decision circuit of FIG. 6 are shown at $a$ in FIG. 8, while the associated variation of the mean values $V_1$, $V_2$, $V_3$ of the output signals from relaxation generators 1, 2, 3 are shown at $b$ as a function of the frequency $f$, if the decision circuit according to FIG. 1 is used.

Furthermore, the signal transition detector 20 of FIG. 6 includes a slicer 21 to which the input signal is applied, and whose decision levels are adjusted just above and below reference level 8, and a differentiating network 22 for the sliced input signal. The output of differentiating network 22 is connected through a full-wave rectifier 23 to the input of relaxation generator 2, and to the input of relaxation generators 1 and 3 through a half-wave rectifier 24 which passes, for example, only positive signals. The operation of adjusting circuit 19 of FIG. 6 will be further described with reference to the time diagrams in FIG. 7.

The supply of input signal $a$ in FIG. 7 to signal transition detector 20 produces the substantially rectangular signal $b$ by slicing input signal $a$ in slicer 21. By differentiation of this sliced signal $b$, in differentiating network 22, a pulse series $c$ is obtained which is composed of a first pulse series of positive needle pulses, which coincide with the positive-going signal transitions of input signal $a$ through reference level R, and a second pulse series of negative needle pulses which are shifted in time relative to the first pulse series, and in this case, coincide with the negative-going signal transitions of input signal $a$ through reference level R. After full-wave rectification of this pulse series $c$ in rectifier 23, a trigger pulse series $d$ occurs at the input of relaxation generator 2, which trigger pulse series is composed of the said first and second pulse series, and in which the needle pulses coincide with both the positive-going and the negative-going signal transitions. The pulse series $e$ obtained by half-wave rectification in rectifier 24 occurs at the input of the two other relaxation generators 1 and 3, which pulse series exclusively comprises the first pulse series, and in which the needle pulses coincide with the positive-going signal transitions.

The two relaxation generators 1 and 3 are controlled basically in the same manner as in the foregoing, by the positive-going signal transitions only, so that also the variation of the mean values $V_1$ and $V_3$ of their output signals as a function of the repetition frequency $f$, has remained the same. On the other hand, the relaxation generator 2 is controlled by both the positive-going and the negative-going signal transitions, which occur at the same repetition frequency $f$, but have a mutual time shift $\tau$. If the sinusoidal input signal $a$ of FIG. 7 changes in frequency, both the repetition frequency $f$ of the signal transitions through the reference level R, and the time shift $\tau$ between successive positive-going and negative-going signal transitions changes. The ratio between this time shift $\tau$ and the repetition period $1/f$ between successive poitive-going signal transitions remains, however, constant so that there applies $\tau = \alpha/f$ in which $\alpha$ is a constant independent of the repetition frequency $f$, and whose value at a given amplitude of the input signal $a$ is only determined by the choice of the reference level R, as may be apparent from FIG. 7.

The variation of the mean value of the output signal from relaxation generator 2 upon supply of pulse series $d$ in FIG. 7 will not further be described, this mean value being $V_2(\alpha)$. For a repetition frequency f of the positive-going input signal transitions which is smaller than $\alpha/\tau_2$, at each pulse of pulse series *d*, relaxation generator 2 provides an output pulse having an amplitude A and a pulse duration $\tau_2$. Per period of input signal *a* of FIG. 7, two output pulses of relaxation generator 2 occur, so that for the mean value $V_2(\alpha)$ there applies; $V_2(\alpha) = 2A\,\tau_2 f$. When $f = \alpha/\tau_2$, $V_2(\alpha)$ reaches the value $2\,\alpha A$ and decreases abruptly to the value $\alpha A$ for values of $f$ just greater than $\alpha/\tau_2$, because in this case, the pulses in pulse series *d* coinciding with the negative-going signal transitions in input signal *a* of FIG. 7, occur within a period $\tau_2$ after the pulses coinciding with the positive-going signal transitions, and thus do not influence relaxation generator 2 which is then in its quasi-stable state. For period of input signal *a*, one output pulse of relaxation generator 2 occurs so that there applies: $V_2(\alpha) = A\,\tau_2 f$; when $f = 1/\tau_2$, $V_2(\alpha)$ reaches the value $A$. For values of $f$ just greater than $1/\tau_2$, $V_2(\alpha)$ again decreases abruptly, and assumes the value $2A/3$ because in this case, every time two pulses of pulse series *d* occur within a duration $\tau_2$ after each transition of relaxation generator 2 to its quasi-stable state, per three periods of input signal *a* there always occurs two output pulses of relaxation generator 2. Hence there applies: $V_2(\alpha) = 2A\,\tau_2\,f/3$. Similarly, the further variation may be derived, and it may be shown that $V_2(\alpha\alpha)$, in addition to the abrupt changes at repetition frequencies $f = n/\tau_2$ with $n = 1, 2, 3, \ldots$ likewise, exhibits abrupt changes at repetition frequencies $f = (n - 1 + \alpha)/\tau_2$. The above-mentioned relations for $V_2(\alpha)$ apply for values of $\alpha$ of less than 0.5, that is to say, in those cases wherein, the time shift $\tau$ of a negative-going signal transition relative to the previous positive-going signal transition is smaller than half the repetition period $1/f$ of the positive-going signal transitions. It can then be simply shown with reference to FIG. 7 that for values of $\alpha$ greater than 0.5 the above-mentioned relations for $V_2(\alpha)$ may likewise be used provided that $(1 - \alpha)$ is substituted for $\alpha$. The variation of $V_2(\alpha)$ as a function of the repetition frequency $f$ is shown at *c* in FIG. 8, while for comparison there is also shown how the mean value $V_2$ varies, if relaxation generator 2 were exclusively controlled by the positive-going signal transitions, hence by pulse series *e* in FIG. 7 just like relaxation generators 1 and 3.

It is thus found, that under the control of pulse series *d* of FIG. 7, the mean value $V_2(\alpha)$ of the output signal from relaxation generator 2 exhibits a first abrupt change at a repetition frequency $f = f_2(\alpha) = \alpha/\tau_2$, whose position is dependent on the chosen value of $\alpha$ and hence, on the choice of reference level R to which the decision levels of slicer 21 are adjusted (compare *a* in FIG. 7). By varying reference level R FIG. 7) at a given amplitude of input signal *a*, this first abrupt change a $f_2(\alpha)$ may be situated at any desired point of the frequency interval between $f = 0$ and $f = ½\,\tau_2$.

As already noted the relaxation periods $\tau_1$ and $\tau_3$ of relaxation generators 1 and 3 have remained equal, namely $\tau_1 = 1/f_1$ and $\tau_3 = 1/f_3$, respectively. The variation of the mean values of their output signals is shown again at *d* in FIG. 8. The value of relaxation period $\tau_2$ of relaxation generator 2 is then chosen to be such, that the abrupt change of mean value $V_2(\alpha)$ at $f_2(\alpha) = \alpha/\tau_2$ lies inside frequency interval $(f_1, f_3)$. By forming the respective difference signals $V_2(\alpha) - V_1$ and $V_3 - V_2(\alpha)$ in difference producers 15 and 16 in the manner already described, and by giving the threshold levels of threshold circuits 7 and 8 suitably chosen positive values, it is now realized that a decision signal exclusively appears at the respective outputs 9 and 10 for repetition frequencies $f$ of the positive-going signal transitions of input signal *a* in FIG. 7 through reference level R, when these frequencies $f$ lie inside the frequency interval $(f_1, f_2(\alpha))$ and the accurately adjoining frequency interval $(f_2(\alpha), f_3)$, respectively. Any ambiguity of the decision is avoided even for repetition frequencies f near the common limit frequency $f_2(\alpha)$.

The position of the common limit frequency $f_2(\alpha)$ may thus be controlled without modifying the relaxation period $\tau_2$ of relaxation generator 2, by varying the value of $\alpha$ in trigger pulse series *d* of FIG. 7, for example, by varying the reference level R to which the decision levels of slicer 21 for input signal *a* of FIG. 7 are adjusted. If it is desired that this common limit frequency $f_2(\alpha)$ can lie at any arbitrary point of frequency interval $(f_1, f_3)$, the relaxation period $\tau_2$ is to be equal to half the relaxation period $\tau_3$; in that case, the maximum value of $f_2(\alpha)$, namely $½\,\tau_2$, is exactly equal to the upper limit $f_3 = 1/\tau_3$ of interval $(f_1, f_3)$. In practice a slightly smaller value than $\tau_3/2$ is preferably chosen for $\tau_2$. The variation of the mean value $V_2(\alpha)$ for the last-mentioned choice of relaxation period $\tau_2$ is shown at *d* in FIG. 8.

The decision circuit described may be advantageously used for remote control of equipment. To this end, the decision circuit according to FIG. 6, with the exception of section 20 of adjusting circuit 19, is provided in the vicinity of the equipment to be controlled, while section 20 of adjusting circuit 19 is accommodated in a remote controlling station. The common limit frequency $f_2(\alpha)$ is then controlled in the controlling station by adjusting the reference level R in a manner as already described, without modifications in the decision circuit or additional control lines being required. Instead of input signal *a* of FIG. 7, pulse series *c* derived from signal transition detector 20 is transmitted through the control line. When the control line has a fairly limited bandwidth, it is advantageous to transmit the output signal from slicer 21 shown at *b* in FIG. 7, instead of this pulse series *c* of FIG. 7, in which case also the differentiating network 22 is provided near the equipment to be controlled, and only slicer 21 is accommodated in the controlling station.

It is likewise possible to transmit pulse series *d* of FIG. 7 through the control line with the aid of the modification of adjusting circuit 19 of FIG. 6 shown in FIG. 9'. At *a* in FIG. 9 the signal transition detector 20 provided in the controlling station is shown which, in addition to slicer 21 and differentiating network 22, also includes a full-wave rectifier 25 for producing this pulse series *d* in response to input signal *a* of FIG. 7. This pulse series *d* is transmitted through a control line 26 to the section of adjusting circuit 19, which is provided near the equipment to be controlled and which is shown at *b* in FIG. 9. The pulse series *d* derived from control line 26 is directly applied to relaxation generator 2 for controlling the position of the common limit frequency $f_2(\alpha)$. Furthermore, this pulse series *d* is applied to a cascade circuit of a bistable trigger 27, a differentiating network 28 and a half-wave rectifier 29, at whose output pulse series *e* of FIG. 7 is obtained, which controls the two relaxation generators 1 and 3. The operation of the decision circuit itself is not changed by the use of this adjusting circuit 19 according to FIG. 9, because the relaxation generators 1, 2 and 3 are controlled by the same pulse series as when using the adjusting circuit 19 of FIG. 6.

FIG. 10 shows a modification of the adjusting circuits 19 in FIG. 6 and FIG. 9, which likewise can be used for the remote control of equipment. Elements which correspond to elements in FIGS. 6 and 9 have the same reference numerals in FIG. 10.

In the adjusting circuit 19 of FIG. 10, likewise as in those of FIGS. 6 and 9, a first pulse series is produced whose positive needle pulses coincide with the positive-going signal transitions through reference level R. As regards the production of the second pulse series, whose pulses exhibit a time shift $\tau$, relative to the first pulse series, this adjusting circuit differs from that of FIGS. 6 and 9 in that this time shift $\tau$ now has a constant value $\tau_o$, which is independent of the repetition frequency $f$ of the first pulse series.

The section of the adjusting circuit accommodated in the controlling station is shown at $a$ in FIG. 10. This section includes the signal transition detector 20, not further shown in this case, and a half-wave rectifier 30 connected thereto by means of which the first pulse series shown at $a$ in FIG. 11 is obtained in the same manner as in the foregoing. Its positive needle pulses coincide with the positive-going signal transitions through reference level R. This first pulse series $a$ is applied to a combination circuit 32 both direct and through a delay circuit 31 having a delay period of $\tau_o$. In FIG. 10, this combination circuit 32 is constituted by a linear difference producer, the directly applied pulse series appearing at its output with positive polarity, and the pulse series delayed over a period $\tau_o$ appearing with negative polarity. The delay circuit 31 is constituted, for example, by a delay line. The pulse series at the output of combination circuit 32 constitutes a pulse series shown at $b$ in FIG. 11, which is transmitted through control line 26. The section of the adjusting circuit provided near the equipment to be controlled, is shown in FIG. 10 at $b$; this section entirely corresponds to the relevant section of adjusting circuit 19 in FIG. 6. Relaxation generator 2 is thus controlled by pulse series $c$ of FIG. 11, which is obtained by full-wave rectification of pulse series $b$ in rectifier 23, while the two other relaxation generators 1 and 3 are controlled by pulse series $a$ of FIG. 11, which is recovered by half-wave rectification of pulse series $b$ in rectifier 24.

Also in the embodiment shown in FIG. 10, the variation of the mean values $V_1$ and $V_3$ of the output signals from relaxation generators 1 and 3 does not vary, because these relaxation generators are controlled in the same manner as in FIGS. 1 and 6 by the positive-going signal transitions only. The variation of the mean value of the output signal from relaxation generator 2 upon application of pulse series $c$ in FIG. 11, which variation is denoted by $V_2(\tau_o)$ for the purpose of of distinction, largely corresponds to the variation of $V_2(\alpha)$ described in the foregoing, when for $\tau_o$ a value is chosen, which is slightly greater than the relaxation period $\tau_2$ of relaxation generator 2.

For a repetition frequency f, which is smaller than $1/(\tau_2 + \tau_o)$, relaxation generator 2 provides an output pulse having an amplitude A and a pulse duration $\tau_2$ at every pulse from pulse series $c$ of FIG. 11. Per period of input signal $a$ of FIG. 7, two output pulses from relaxation generator 2 thus occur, so that for $V_2(\tau_o)$ applies: $V_2(\tau_o) = 2\ A\ \tau_2 f$. When $f = 1/(\tau_2 + \tau_o)$, $V_2(\tau_o)$ reaches the value $2A\ \tau_2/(\tau_2 + \tau_o)$, and abruptly decreases for values of $f$ just greater than $1/(\tau_2 + \tau_o)$ to the value $A\ \tau_2/(\tau_2 + \tau_o)$. In fact, the pulses in pulse series $c$ of FIG. 11 coinciding with pulse series $a$ of FIG. 11, now occur within a duration $\tau_2$ after the pulses in pulse series $c$ coincide with the pulse series $a$ delayed over a period $\tau_o$. Thus they do not influence relaxation generator 2, which is then still in its quasi-stable state. Per period of input signal $a$ of FIG. 7, only one output pulse from relaxation generator 2 occurs, so that there applies: $V_2(\tau_o) = A\ \tau_2 f$, $V_2(\tau_o)$, reaching the value $A$ at $f = 1/\tau_2$. For values of $f$ just greater than $1/\tau_2$, $V_2(\tau_o)$ again decreases abruptly and assumes the value $2A/3$, because always pulses of pulse series $c$ occur within a duration $\tau_2$ after each transition of relaxation generator 2 to its quasi-stable state, so that then always two output pulses from relaxation generator 2 occur per three periods of input signal $a$ of FIG. 7, and hence there applies: $V_2\ (\tau_2) = 2A\ \tau_2 f/3$. Similarly, the further variation of $V_2(\tau_o)$ can be derived, and it appears that in addition to the abrupt changes at repetition frequencies $f = n/\tau_2$ with $n = 1, 2, 3, \ldots$, abrupt changes also occur at repetition frequencies $f = (2n - 1)/(\tau_2 + \tau_o)$. The variation of $V_2(\tau_o)$ is shown at $e$ in FIG. 8 as a function of the repetition frequency $f$.

Thus it is found, that $V_2(\tau_o\ )$ exhibits a first abrupt change at a repetition frequency $f = f_2(\tau_o) = 1/(\tau_2 + \tau_o)$ whose position is dependent on the chosen value of $\tau_o$, hence of the choice of the delay period of delay circuit 31 in FIG. 10. By varying this delay period $\tau_o$, (which is assumed to be greater than $\tau_2$) this first abrupt change at $f_2(\tau_o)$ may be situated at substantially any point within the frequency interval between $f = 0$ and $f = ½\ \tau_2$.

This variation of $V_2(\tau_o)$ may be utilized in exactly the same manner as the already extensively described variation of $V_2(\alpha)$. Particularly, the relaxation period $\tau_2$ of relaxation generator 2 may again be chosen to be such that the abrupt change of $V_2(\tau_o)$ at $f_2(\tau_o) = (1/\tau_2 + \tau_o)$ lies at any arbitrary Point of the frequency interval $(f_1, f_3)$, and to this end, again a value for $\tau_2$ slightly smaller than $\tau_3/2$ is preferred. Also when using the adjusting circuit shown in FIG. 10, the decision circuit indicates unambiguously whether the repetition frequency $f$ lies inside the frequency interval $(f_1, f_2(\tau_o))$ and the accurately adjoining frequency interval $(f_2(\tau_o), f_3)$, respectively, or lies outside these two intervals. The position of the common limit frequency $f_2(\tau_o)$ is a controlled modification of the relaxation period $\tau_2$of relaxation generator 2 and is accomplished by varying the delay period $\tau_o$ of delay circuit 31 of FIG. 10.

FIG. 12 shows a modification of the adjusting circuit of FIG. 10, corresponding elements in the two Figures having the same reference numerals. The adjusting circuit of FIG. 12 differs from that of FIG. 10 in so far as the construction of delay circuit 31 is concerned. The delay circuit 31 in FIG. 12 is constituted by a monostable relaxation generator 33 having a relaxation period $\tau_o$, a differentiating network 34 connected thereto, and a half-wave rectifier 35, which only passes the negative output pulses from differentiating network 34. Furthermore, the combination circuit 32 is constituted by a linear adder in this case.

When the pulses in pulse series $a$ of FIG. 11, which series is applied to delay circuit 31, occur at a repetition frequency $f$ smaller than $1/\tau_o$, relaxation generator 33 provides an output pulse having a pulse duration of $\tau_o$ at each pulse in pulse series *a*. A series of negative needle pulses is obtained by means of differentiating network 34 and rectifier 35, said needle pulses coinciding with the trailing edges of the output pulses from relaxation generator 33, and thus exhibiting a time delay $\tau_o$ relative to pulse series *a*. Combination of this second pulse series with the first pulse series *a* in combination circuit 32, leads in this case again to pulse series *b*in FIG. 11. When the pulses in the first pulse series *a* occur, however, at a frequency *f* just greater than $1/\tau_o$, the next pulse in pulse series *a* occurs within a period $\tau_o$ after a transition of relaxation generator 33 to its quasi-stable state, so that a negative needle pulse occurs at the output of combination circuit 32 only at every second pulse in pulse series *a*. Likewise, for frequencies *f* just larger than $n/\tau_o$ with $n = 1, 2, 3, \ldots$, only one negative needle pulse occurs at every $(n + 1)$ pulses in pulse series *a*.

The pulse series which is applied to relaxation generator 2 when using the adjusting circuit of FIG. 12, thus differs slightly from that when using the adjusting circuit in FIG. 10 for frequencies *f* larger than $1/\tau_o$. The variation of the mean value of the output signal from relaxation generator 2, now indicated by $V'_2(\tau_o)$, accordingly deviates slightly from the described variation of $V_2(\tau_o)$. This variation $V'_2(\tau_o)$ may be derived in the manner described hereinbefore, and it is found that $V_2'(\tau_o)$ for values of *f* smaller than $1/\tau_2$ coincides with that of $V_2(\tau_o)$ and hence, also exhibits a first abrupt change at $f_2(\tau_o) = 1/(\tau_2 + \tau_o)$. When $f = 1/\tau_2$, $V_2'(\tau_o)$ abruptly changes to the value $A/2$ instead of $2A/3$, and when $f = 3/(\tau_2 + \tau_o)$, $V_2'(\tau_o)$ does not exhibit an abrupt change in contrast to $V_2(\tau_o)$. For the sake of comparison, the variation of $V_2'(\tau_o)$ is likewise shown at *e* in FIG. 8. Otherwise, the variation of $V_2'(\tau_o)$ in the embodiment described may be utilized in the same manner as the variation of $V_2(\tau_o)$.

The choice between the adjusting circuits according to FIGS. 10 and 12 is determined by the question, which variation of the mean value of the output signal from relaxation generator 2 is desired for a given application. If this variation is not decisive, for example, for values of *f* smaller than $1/\tau_2$, the adjusting circuit of FIG. 12 is preferred to that according to FIG. 10, because the relaxation period of relaxation generator 33 in FIG. 12, and the delay period of a delay line in FIG. 10, must be changed for modifying the delay period $\tau_o$, which latter change produces greater problems in practice.

Furthermore, it is to be noted that in the adjoining circuits of FIGS. 10 and 12, also delay times $\tau_o$ may be used which are just slightly smaller than the relaxation period $\tau_2$. In that case, however, the variation of $V_2(\tau_o)$ and $V_2'(\tau_o)$ is less attractive, because both the abrupt changes in $V_2(\tau_o)$ and $V_2'(\tau_o)$ are smaller, and the position of the abrupt changes is less favorable than for the extensively described choice of values $\tau_o$, which are slightly greater than $\tau_2$, so that the latter choice is preferred in practice.

Finally, it is to be noted that it is alternatively possible in the adjusting circuits of FIGS. 10 and 12 to transmit through control line 26, pulse series *c* of FIG. 11 exclusively comprising positive needle pulses, in instead of pulse series *b* of FIG. 11. This may be effected in the same manner as in the adjusting circuit of FIG. 9 by connecting, for example, a full-wave rectifier to the output of combination circuit 32 in the controlling station, and by constructing the section of the adjusting circuit in the equipment to be controlled as is shown at *b* in FIG. 9. When in this case combination circuit 32 of FIG. 10 is constituted by an adder, and in FIG. 12 is constituted by a difference producer, it is not necessary to connect a full-wave rectifier to these particular combination circuits 32 so as to obtain pulse series *c* in FIG. 11. As in the adjusting circuit of FIG. 9, the operation of the decision circuit itself is not changed by these modifications, because the control of the relaxation generators 1, 2 and 3 is not influenced by these modifications.

What is claimed is:

1. A decision circuit which, in response to an input signal in which signal transitions passing through a fixed reference level in a given direction occur at a given repitition frequency, generates a decision signal which is dependent on the position of said repetition frequency relative to a prescribed restricted frequency interval, said decision circuit comprising:

signal input means;

at least two monostable relaxation generators having different relaxation periods, and respective inputs which are commonly coupled to said signal input means, said relaxation generators changing over to a quasi-stable state at said signal transitions, and providing output pulses having a duration independent of the repetition frequency of said signal transitions;

cascade circuit means connected to said monostable relaxation generators, said cascade circuit means comprising smoothing filter means for receiving said output pulses from said relaxation generators, and combination network means connected to said smoothing filter means; and threshold circuit means connected to said combination network means, said threshold circuit means having an output constituting a decision signal output.

2. A decision circuit which, in response to an input signal in which signal transitions passing through a fixed reference level in a given direction occur at a given repetition frequency, generates a decision signal which is dependent on the position of said repetition frequency relative to a prescribed restricted frequency interval, said decision circuit comprising:

signal input means; generators at least two monostable relaxation generatOrs having different relaxation periods, and changing over to a quasistable state at said signal transitions, and providing output pulses having a duration independent of the repetition frequency of said signal transitions;

an adjusting circuit connected between the signal input means and said monostable relaxation generators, said adjusting circuit comprising a signal transition detector, and producing a first pulse series by means of signal transition detection by said detector, the pulses of said first pulse series corresponding to said signal transitions, said adjusting circuit also producing a second pulse series whose pulses are shifted in time relative to said first pulse series, and applying both pulse series as a combined series of trigger pulses to at least one of said relaxation generators for controlling the position of at least one of the limits of said prescribed frequency interval;

cascade circuit means connected to said monostable relaxation generators; and a threshold circuit connected to said cascade circuit means having an output constituting a decision signal output.

3. The decision circuit as claimed in claim 2, wherein said signal transition detector includes a slicer whose decision levels are adjusted at said reference level, and a network connected to said slicer for differentiating an output signal of the slicer.

4. The decision circuit as claimed in claim 3, wherein a half-wave rec4ifier is connected to an output of said signal transition detector for producing said first series, an output of the half-wave rectifier being connected, both directly and through a delay circuit for producing said second pulse series, to a combination circuit from which said series of trigger pulses is derived.

5. The decision circuit as claimed in claim 4, wherein said delay circuit comprises a monostable relaxation generator which provides output pulses having a duration determined by its relaxation period, a differentiating network connected to said relaxation generator and a half-wave rectifier which passes to said combination circuit only those output pulses of said differentiating network that coincide with the trailing edges of the output pulses from said relaxation generator.

6. The decision circuit as claimed in claim 5, wherein the connection between the output of said signal transition detector and an input of the relaxation generator which is controlled by said series of trigger pulses includes a full-wave rectifier.

7. The decision circuit as claimed in wherein the connection between the output of said signal transition detector and an input of a relaxation generator which is controlled exclusively by one of the two pulse series from said series of trigger pulses, includes a half-wave rectifier.

* * * * *

PO-1050
(5/69)

UNITED STATES PATENT OFFICE
CERTIFICATE OF CORRECTION

Patent No. 3,763,435. Dated October 2, 1973

Inventor(s) BENEDICTUS TIMOTHEUS JOHANNES HOLMAN

It is certified that error appears in the above-identified patent and that said Letters Patent are hereby corrected as shown below:

Claim 2, line 8, after "means;" cancel "generators".

Claim 4, "rec4ifier" should be --rectifier--.

Signed and sealed this 19th day of February 1974.

(SEAL)
Attest:

EDWARD M.FLETCHER,JR.
Attesting Officer

C. MARSHALL DANN
Commissioner of Patents

PO-1050
(5/69)

UNITED STATES PATENT OFFICE
CERTIFICATE OF CORRECTION

Patent No. 3.763,435 Dated October 2, 1973

Inventor(s) BENEDICTUS TIMOTHEUS JOHANNES HOLMAN

It is certified that error appears in the above-identified patent and that said Letters Patent are hereby corrected as shown below:

IN THE TITLE PAGE

Insert where appropriate

--Assignee..U.S. Philips Corporation--

Signed and sealed this 29th day of October 1974.

(SEAL)
Attest:

McCOY M. GIBSON JR.
Attesting Officer

C. MARSHALL DANN
Commissioner of Patents